US012591699B2

(12) United States Patent
He et al.

(10) Patent No.: US 12,591,699 B2
(45) Date of Patent: Mar. 31, 2026

(54) ESTABLISHING COMMUNICATION STREAM WITH DATABASE CONTROL AGENT OVER WHICH DATABASE COMMANDS ARE DISPATCHED FOR EXECUTION AGAINST DATABASE

(71) Applicant: MICRO FOCUS LLC, Santa Clara, CA (US)

(72) Inventors: Xiaojing He, Cambridge, MA (US); Daniel L. Christensen, Provo, UT (US)

(73) Assignee: Micro Focus LLC, Santa Clara, CA (US)

( * ) Notice: Subject to any disclaimer, the term of this patent is extended or adjusted under 35 U.S.C. 154(b) by 322 days.

(21) Appl. No.: 18/102,751

(22) Filed: Jan. 29, 2023

(65) Prior Publication Data

US 2024/0256689 A1 Aug. 1, 2024

(51) Int. Cl.
G06F 21/62 (2013.01)
G06F 16/21 (2019.01)

(52) U.S. Cl.
CPC .......... G06F 21/6218 (2013.01); G06F 16/21 (2019.01); G06F 2221/2115 (2013.01)

(58) Field of Classification Search
CPC ................. G06F 21/6218; G06F 16/21; G06F 2221/2115
See application file for complete search history.

(56) References Cited

U.S. PATENT DOCUMENTS

| | | | | |
|---|---|---|---|---|
| 8,069,153 B2 | 11/2011 | Chan et al. | | |
| 10,572,549 B2 | 2/2020 | Kanumolu | | |
| 2002/0059295 A1* | 5/2002 | Ludtke | ................. | H04N 21/422 |
| 2004/0122953 A1* | 6/2004 | Kalmuk | ............. | G06F 16/2308 |
| | | | | 709/227 |
| 2016/0014175 A1* | 1/2016 | Somuah | .................. | H04L 65/60 |
| | | | | 709/202 |
| 2016/0142917 A1* | 5/2016 | Calo | ...................... | H04W 4/029 |
| | | | | 705/7.33 |
| 2017/0357533 A1* | 12/2017 | Chaganti | ............... | G06F 16/338 |
| 2018/0129533 A1* | 5/2018 | Pashov | .................. | G06F 9/4881 |
| 2018/0255021 A1* | 9/2018 | Pellizzer | ................ | G06F 21/62 |
| 2023/0153304 A1* | 5/2023 | Dong | .................. | G06F 16/2456 |
| | | | | 707/714 |
| 2024/0022402 A1* | 1/2024 | Pellizzer | ............... | H04L 63/083 |

* cited by examiner

*Primary Examiner* — Sherief Badawi
*Assistant Examiner* — Earl Levi Elias
(74) *Attorney, Agent, or Firm* — Sheridan Ross P.C.

(57) ABSTRACT

Management program code is executable by a management server on a management network to perform processing. The processing includes establishing a communication stream with a database control agent for a database on a database network separate from the management network, without opening any ports on the database network for access by the management program code. The processing includes receiving a database command for the database from client program code, and dispatching the database command to the database control agent over the communication stream for execution against the database. The processing includes receiving execution results of the database command from the database control agent over the communication stream, and returning the execution results to the client program code in satisfaction of the database command.

20 Claims, 12 Drawing Sheets

400

DISPATCH PROGRAM
CODE 116

ESTABLISH COMM
STREAM WITH
CONTROL AGENT          402

ADD CONTROL AGENT
TO AGENT MAP          404

COMMAND PROGRAM
CODE 114

RECEIVE DB
COMMAND FROM
CLIENT PROGRAM
CODE VIA API          412

STORE DB COMMAND
IN COMMAND QUEUE          414

420

DISPATCH PROGRAM
CODE 116

422　POLL COMMAND QUEUE FOR NEWLY STORED DB COMMAND

424　NEWLY STORED DB COMMAND?

NO

YES

425　RETRIEVE DB COMMAND

426　IDENTIFY WHETHER CONTROL AGENT FOR DATABASE TO WHICH DB COMMAND PERTAINS HAS BEEN ADDED TO AGENT MAP

432

428　ADDED TO AGENT MAP?

NO　DONE

YES

430　DISPATCH DB COMMAND TO CONTROL AGENT OVER COMM STREAM

440

DISPATCH PROGRAM
CODE 116

442
IDENTIFY WHETHER
COMMAND QUEUE STORES
ANY DB COMMANDS
PERTAINING TO DATABASE
FOR WHICH CONTROL
AGENT HAS BEEN NEWLY
ADDED TO AGENT MAP

444
ANY DB COMMANDS?      NO      446
DONE

YES

448
RETRIEVE DB
COMMANDS

450
DISPATCH DB
COMMANDS TO
CONTROL AGENT
OVER COMM STREAM

600
FIG 6A
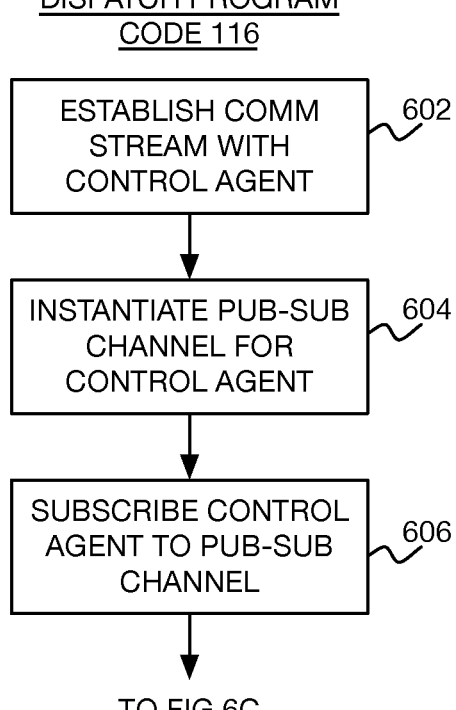
DISPATCH PROGRAM
CODE 116
ESTABLISH COMM
STREAM WITH
CONTROL AGENT    602
INSTANTIATE PUB-SUB
CHANNEL FOR
CONTROL AGENT    604
SUBSCRIBE CONTROL
AGENT TO PUB-SUB
CHANNEL    606
TO FIG 6C

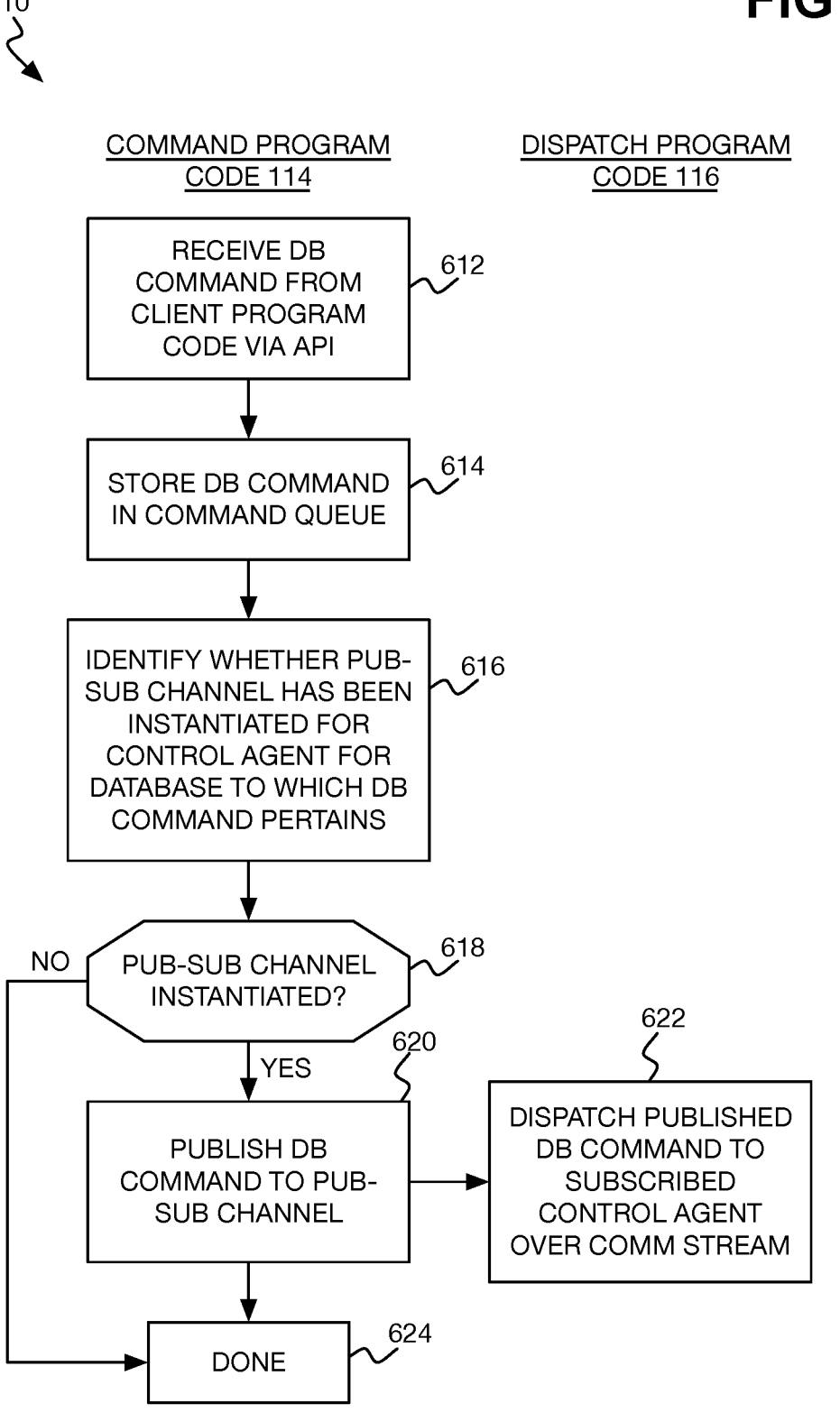

COMMAND PROGRAM
CODE 114

DISPATCH PROGRAM
CODE 116

RECEIVE DB
COMMAND FROM
CLIENT PROGRAM
CODE VIA API — 612

STORE DB COMMAND
IN COMMAND QUEUE — 614

IDENTIFY WHETHER PUB-
SUB CHANNEL HAS BEEN
INSTANTIATED FOR
CONTROL AGENT FOR
DATABASE TO WHICH DB
COMMAND PERTAINS — 616

PUB-SUB CHANNEL
INSTANTIATED? — 618

NO

YES — 620

PUBLISH DB
COMMAND TO PUB-
SUB CHANNEL

DISPATCH PUBLISHED
DB COMMAND TO
SUBSCRIBED
CONTROL AGENT
OVER COMM STREAM — 622

DONE — 624

Figure 6C:
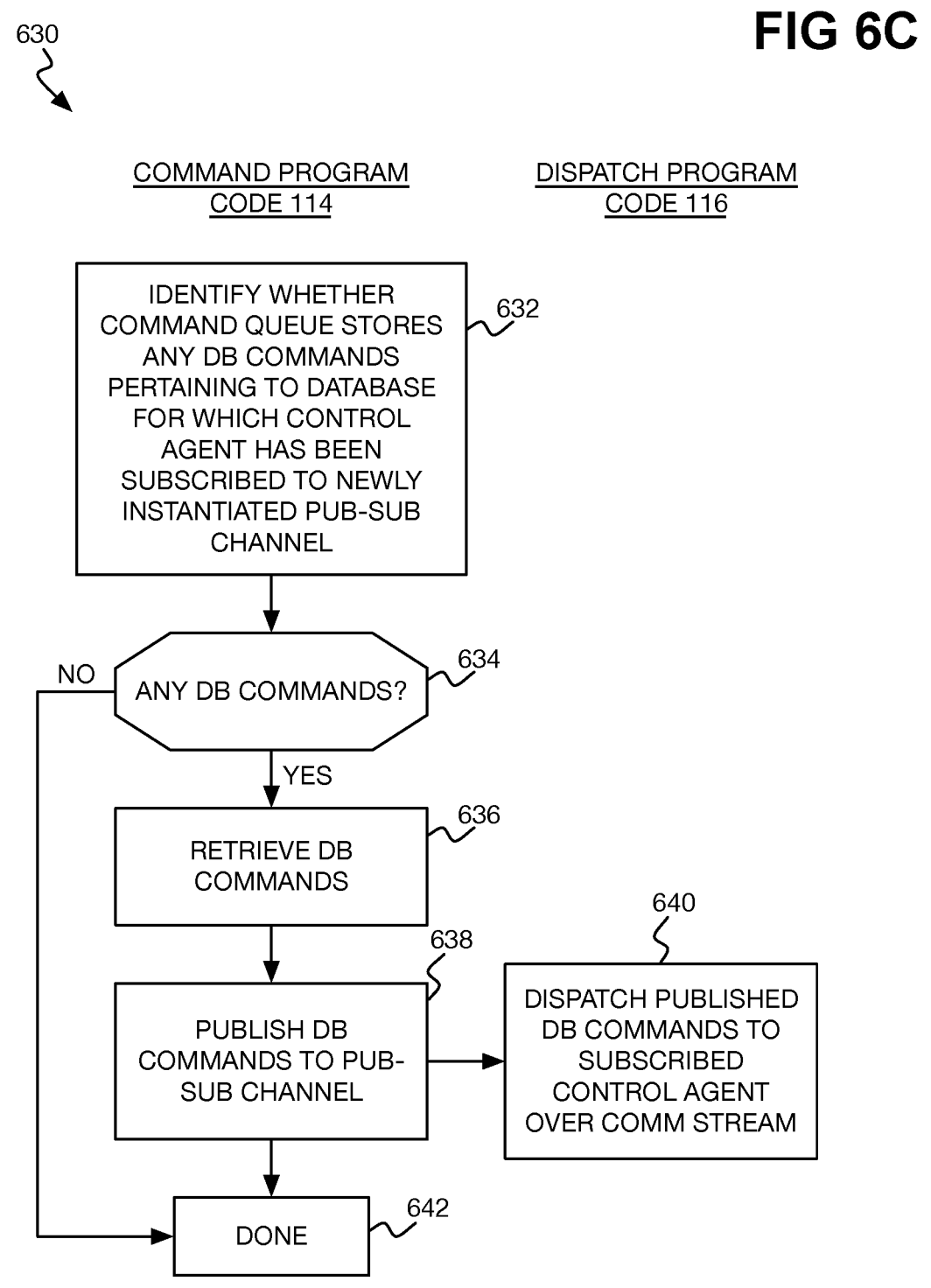

COMMAND PROGRAM
CODE 114

DISPATCH PROGRAM
CODE 116

IDENTIFY WHETHER
COMMAND QUEUE STORES
ANY DB COMMANDS
PERTAINING TO DATABASE
FOR WHICH CONTROL
AGENT HAS BEEN
SUBSCRIBED TO NEWLY
INSTANTIATED PUB-SUB
CHANNEL — 632

ANY DB COMMANDS? — 634

NO

YES

RETRIEVE DB
COMMANDS — 636

640

PUBLISH DB
COMMANDS TO PUB-
SUB CHANNEL — 638

DISPATCH PUBLISHED
DB COMMANDS TO
SUBSCRIBED
CONTROL AGENT
OVER COMM STREAM

DONE — 642

Figure 7:
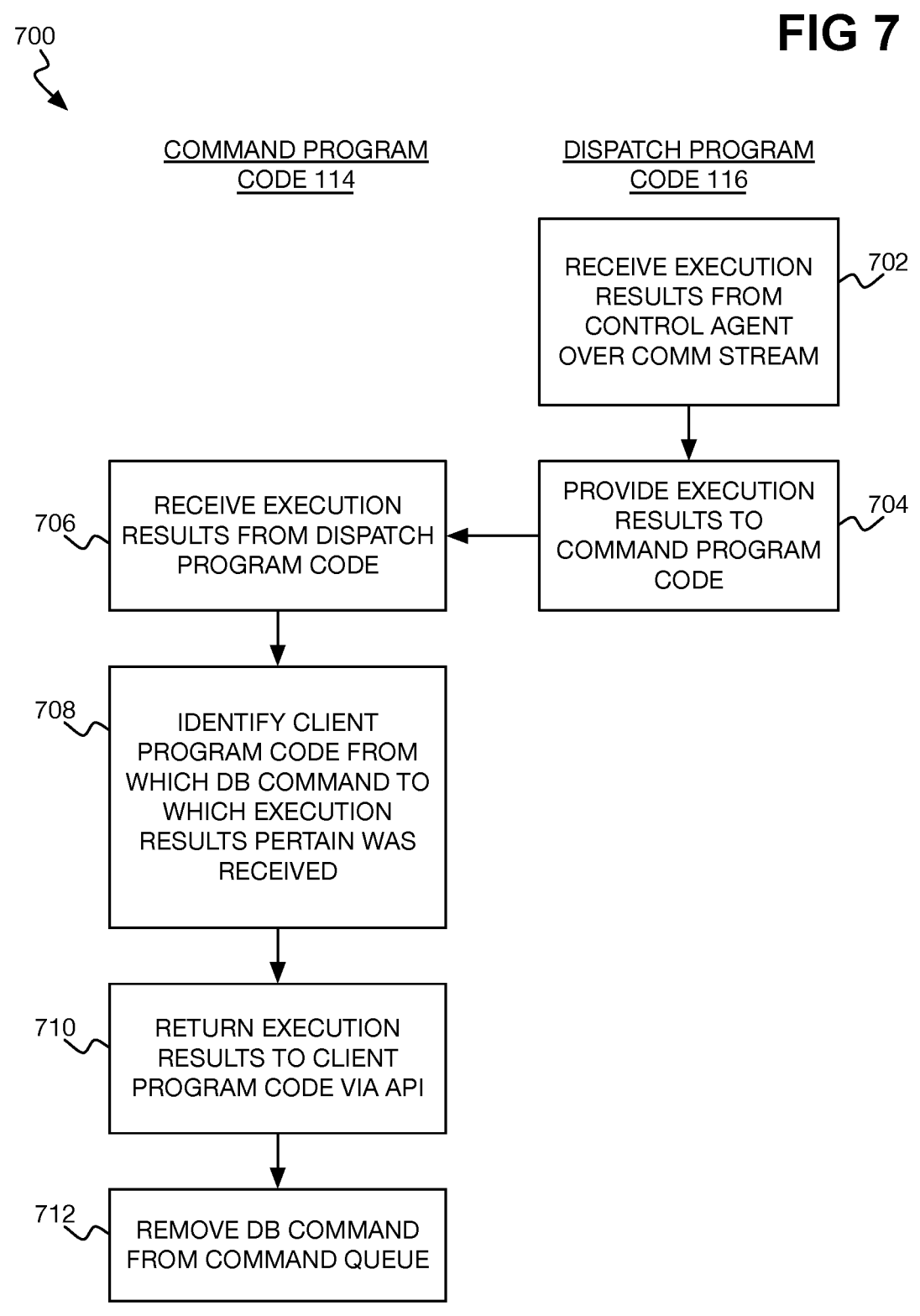

COMMAND PROGRAM
CODE 114

DISPATCH PROGRAM
CODE 116

RECEIVE EXECUTION
RESULTS FROM
CONTROL AGENT
OVER COMM STREAM — 702

PROVIDE EXECUTION
RESULTS TO
COMMAND PROGRAM
CODE — 704

706 — RECEIVE EXECUTION
RESULTS FROM DISPATCH
PROGRAM CODE

708 — IDENTIFY CLIENT
PROGRAM CODE FROM
WHICH DB COMMAND TO
WHICH EXECUTION
RESULTS PERTAIN WAS
RECEIVED

710 — RETURN EXECUTION
RESULTS TO CLIENT
PROGRAM CODE VIA API

712 — REMOVE DB COMMAND
FROM COMMAND QUEUE

ESTABLISHING COMMUNICATION STREAM WITH DATABASE CONTROL AGENT OVER WHICH DATABASE COMMANDS ARE DISPATCHED FOR EXECUTION AGAINST DATABASE

BACKGROUND

Organizations, including large organizations such as enterprises, typically generate and collect voluminous amounts of information, which are often stored in one or more databases. In some situations, an organization may privately host its own databases. For example, an organization may privately host its databases using the organization's own network resources. As another example, the organization may instead leverage the network resources of a service provider to privately host its database within an instance of the service provider's network resources. In each of these cases, the database of the organization is considered to be hosted on a network that is referred to as a database network herein.

BRIEF DESCRIPTION OF THE DRAWINGS

FIGS. 6A, 6B, and 6C are flowcharts of example methods consistent with FIG. 2 and that are used in the implementation of FIG. 5 to dispatch received database commands from the management network to the database network.

FIG. 7 is a flowchart of an example method consistent with FIG. 2 and that is used in the implementations of FIGS. 3 and 5 to return execution results received from the database network in satisfaction of the database commands dispatched to the database network.

DETAILED DESCRIPTION

Figure 1:
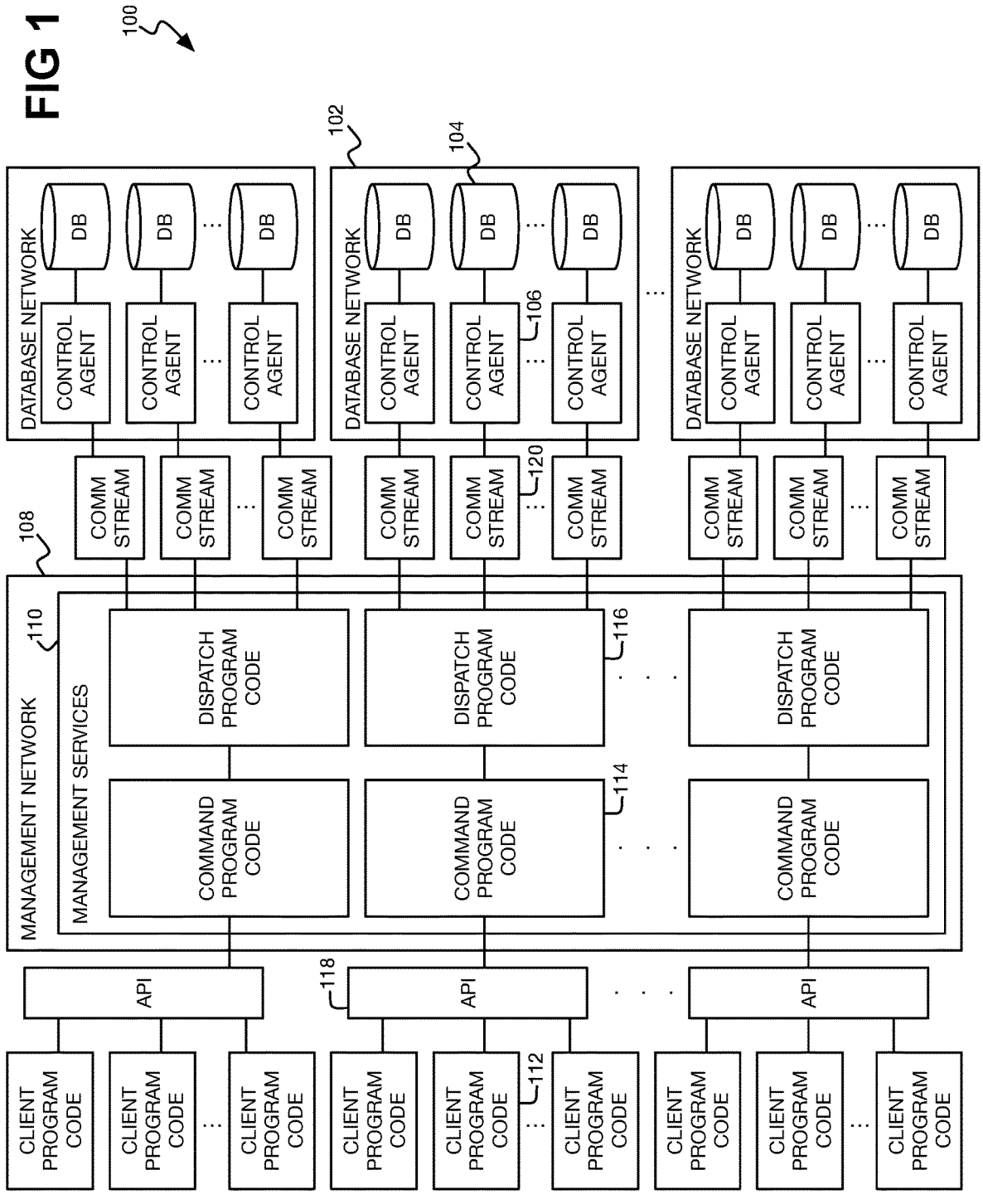
FIG. 1 shows a diagram of an example system by which a management network is communicatively connected with database networks using communication streams, without having to expose or open network ports on the database networks.

As noted in the background, an organization can privately host a database on a database network, either using its own network resources or an instance of those of a third-party service provider. The organizations may have its own administrators to perform day-to-day management of the database, so that the database has optimal performance for storing and returning data. The database may be accessible via web services for external usage, or may only be internally accessible with the organization's own private network. The database may be embedded within an application or solution, in which case there can be layers of security or network segregation that limit direct access to the database.

At times, an organization may wish for a third party to perform management on the database. Such management may be supplemental to the day-to-day management that the organization's own administrators perform. For example, such management may be beyond the expertise of the organization's own administrators, or involve specialized tasks like database tuning to verify the database is performing optimally. In other cases, the third party may supplant in-house database administration by the organization, such that the third party performs all administration. Regardless of whether database management on the database is performed by the organization's own administrators or by a third party, such management is indirectly performed outside of the scope of the application or solution in which the database is embedded.

For databases such as the column-oriented Vertica Analytics Platform database available from Vertica, a Micro Focus Company headquartered in Cambridge, Mass., third party access of a database occurs through a management or control plane. For example, in the case of the Vertica Analytics Platform database, such a management or control plane is the Vertica Accelerator Control Plane. Data control language (DCL) commands to manage the database, as well as database query language (DQL) commands to query the database, are received at the management or control plane and executed against the database.

The management or control plane resides on a different network than the database network, and is referred to herein as a management network. The management network may be considered a public network in that the network exposes services over a public network such as the Internet, or may be a private network, albeit a different private network than that of the database network and one that may be less restrictive than the database network. Even if the database network is realized as an instance of network resources of a service provider, and the management network is realized as a separate instance of network resources of that same service provider, the two networks are still considered separate.

Therefore, for the management or control plane of a third party to access the database network of an organization (and thus access the database hosted on that network), ordinarily network ports are opened or exposed on the database network. (For instance, in the case in which the database is embedded within an application or solution, such exposed ports are in effect holes within the application or solution architecture.) The management or control plane is then able to access the database over these exposed network ports. Even with the vast amount of sophisticated security monitoring techniques available, however, opening network ports on a database network adds to some degree a security vulnerability that many organizations do not want to risk.

In such cases, this means that an organization cannot benefit from total or supplemental third-party management of the organization's database via the management or control plane of the third party. The organization may decide to refrain from third party management completely, unavailing itself of the third party's expertise. The organization may decide to have the third party physically travel to the location of the database network periodically, in order to perform network management functions locally instead of remotely via a management or control plane, which can be inconvenient and costly. As another example, the organization may have to provide virtual private network (VPN) or secure shell (SSH) to grant broader permissions to the third party than that which the organization is comfortable providing from a security perspective.

Techniques described herein provide for management or control plane access of a database hosted on a database network different the management network at which the management or control plane resides without having to open or expose network ports at the database network. Instead, a database control agent is installed on the database network that can locally execute database commands. A bidirectional and persistent communication stream is then initiated by the database control agent with the management or control plane.

The communication stream permits the management or control plane to dispatch database commands to the database control agent without having any opened or exposed network ports at the database network. The communication stream likewise permits the database control agent to return execution results in satisfaction of the database commands back to the management or control plane without having any opened or exposed network ports at the database network. The communication stream may be established over a Google Remote Procedure Call (gRPC) framework, for instance, or another type of bi-directional network connection initiated by the control agent.

FIG. 1 shows an example architecture or system 100 in which there are multiple database networks 102 of respective organizations. Each database network 102 may be for a separate organization, or a given organization may have multiple separate database networks 102. A database network 102 utilizes private networking resources of its respective organization, or utilizes a private instance of network resources provided by a service provider.

Each database network 102 hosts one or more databases 104. Each database 104 may be an instance of the Vertica Analytics Platform database noted above. For each database 104 on each network 102, a database control agent 106 is installed. A database control agent 106 is program code that is able to execute commands—including DQL commands and DCL commands—against its respective database 104 to receive execution results in return. The system 100 can include appropriate authentication and authorization mechanisms to ensure that a database control agent 106 receives database commands for the database 104 for which the agent 106 is authorized.

A management network 108 separate from the database networks 102 includes management services 110. The management network 108 may be realized using private networking resources of a third party, or utilize a private instance of network resources provided by a service provider (which may be the same service provider that the organizations leverage for their database networks 104). The management services 110 corresponds to the aforementioned management or control plane, and can be implemented as one or more computing devices with suitable hardware. The management services 110 can be provided by one or multiple management servers.

The system 100 includes client program code 112 external to the management network 108 and the database networks 102. The client program code 112 may run on web browsers or command-line interfaces (CLIs) of client computing devices, such as desktop, laptop, and network computers, smartphones, tablet computing devices, and so on. The client program code 112 generates the database commands, such as the DQL and DCL commands, that are ultimately executed at the appropriate databases 104, and ultimately receives the execution results of these commands.

The system 100 can include appropriate authentication and authorization mechanisms to ensure that database commands generated by the client program code 112 are dispatched to just those databases 104 to which the program code 112 has access. Furthermore, in addition to DQL and DCL commands, the client program code 112 can be utilized in lieu of a database driver extension library, such as the Java database connectivity (JDBC) library, the open database connectivity (ODBC) library, and so on.

The management services 110 execute pairs of command program code 114 and dispatch program code 116. Additional command program code 114-dispatch program code 116 pairs can be added as needed for scalability purposes. For example, as larger numbers of database commands from the same or additional client program code 114 are received, more pairs of command program code 114 and dispatch program code 116 can be instantiated to accommodate the commands. Similarly, as more database networks 102 and/or more databases 104 are added, more command program code 114-dispatch program code 116 pairs can be instantiated to accommodate these increased numbers.

The management network 108 exposes application programming interfaces (APIs) 118 by which the client program code 112 send database commands and receive execution results in return. For example, the API 118 may be a representational state transfer (REST) API. Each REST API 118 may be particularly exposed by or otherwise assigned to corresponding command program code 114. It is thus the command program code 114 that communicates directly with the client program code 112. (It is noted that the API 118 is shown external to the management network 108, but in actuality can be part of or internal to the command program code 114.) Other examples of APIs 118 include those in accordance with the gRPC framework, the simple object access protocol (SOAP), the hypertext transport protocol (HTTP), and so on.

The database control agents 106 initiate communication streams 120 with the management network 108 by which the control agents 106 receive database commands and send execution results in return. As noted, the communication streams 120 may be initiated over the gRPC framework. Each communication stream 120 is specifically established between a database control agent 106 and corresponding dispatch program code 116, where one instance of dispatch program code 116 may handle multiple communication streams 120. It is thus the dispatch program code 116 that communicates directly with a control agent 106.

It is further noted that when a database command is dispatched to a control agent 106, the control agent 106 can immediately acknowledge receipt of the command to the dispatch program code 116. If the control agent 106 is momentarily disconnected, when the control agent 106 is reconnected, the dispatch program code 116 re-dispatches any dispatch command for which prior acknowledgment was not received from the control agent 106.

Figure 2:
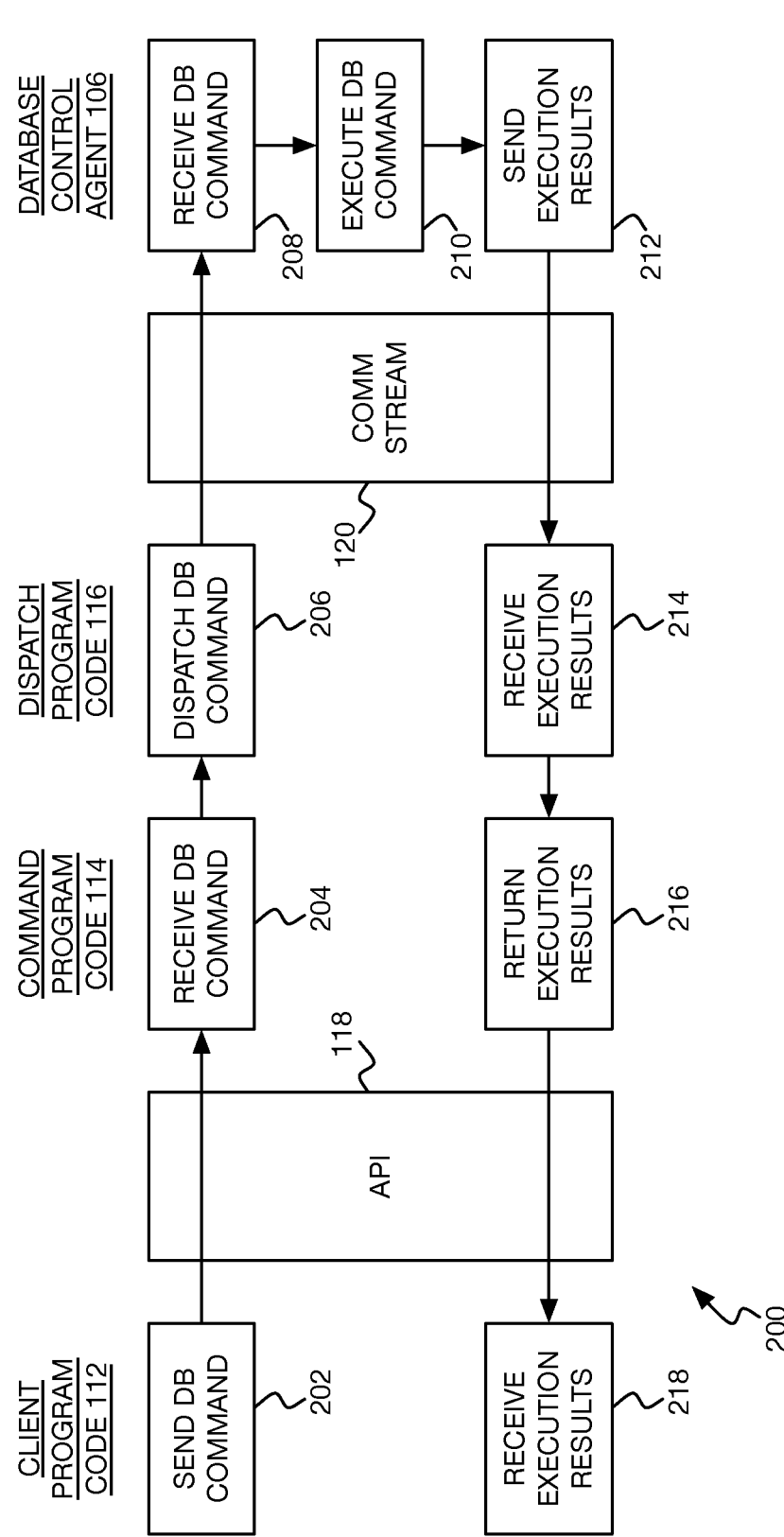
FIG. 2 is a diagram of an example process consistent with FIG. 1, by which a database command is received and dispatched for execution, and by which corresponding execution results are then received and returned.

FIG. 2 shows an example general process 200 by which the architecture or system 100 operates. Client program code 112 sends (202) a database command intended for a given database 104 via the API 118, such that the corresponding command program code 114 receives (204) the command 202 at the API 118. The corresponding dispatch program code 116 in turn dispatches (206) the database command 202 through a communication stream 120 for the database 104, by which the corresponding database control agent 106 receives (208) the command.

The database control agent 106 executes (210) the database command against the database 104 in question, and sends (212) execution results regarding the database command as provided by the database 104 through the same communication stream 120, by which the corresponding dispatch program code 116 receives (214) the execution results. The corresponding program code 114 in turn returns (216) the execution results via the API 118, such that the originating client program code 112 receives (218) the execution results in satisfaction of the database command at the API 118. In one implementation, the execution results are returned in response to a subsequent query by the originating program code 112 via the API 118.

Figure 3:
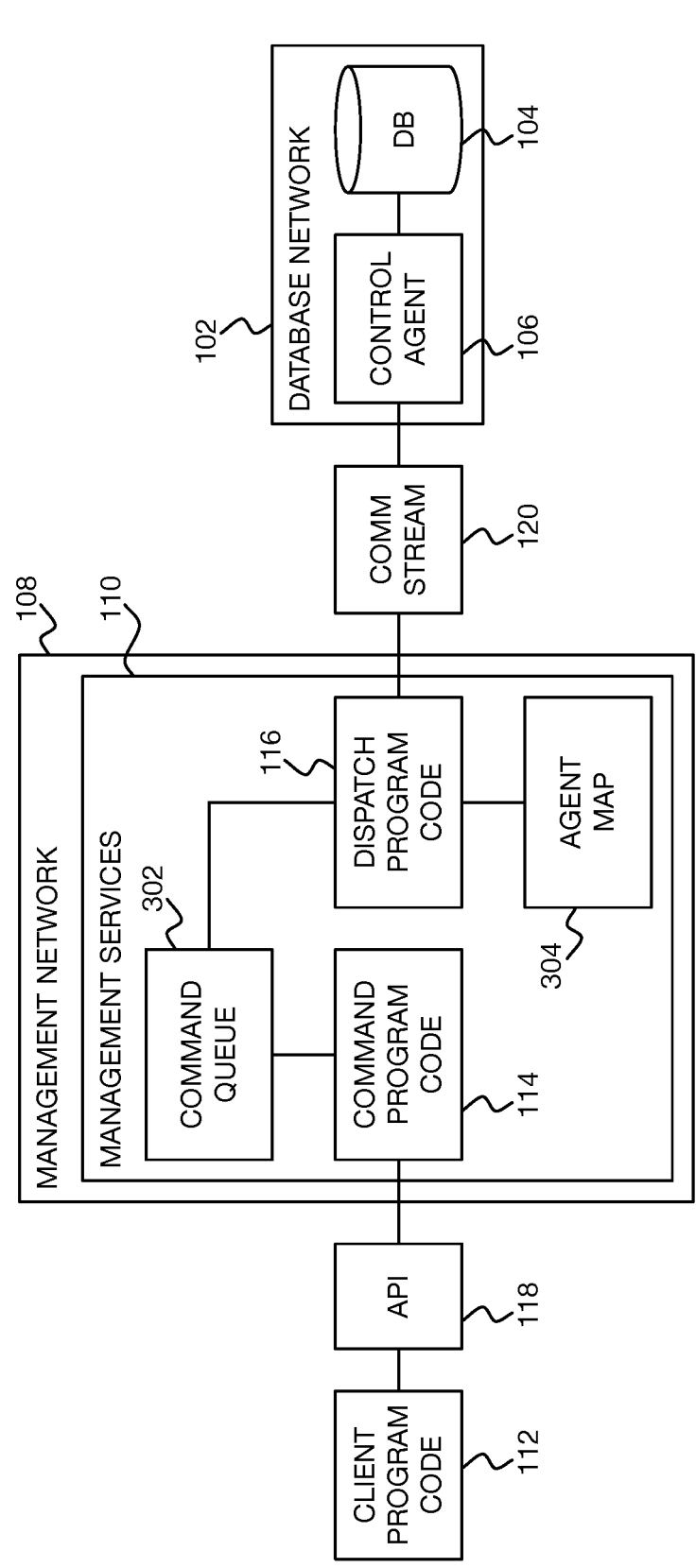
FIG. 3 is a diagram of a first example implementation of a management network consistent with FIG. 1 and that that is to communicatively connect with a database network using a communication stream without having to expose or open network ports on the database network.

FIG. 3 shows a specific implementing architecture or system 300 that is consistent with the general architecture or system 100. In the example, just one database network 102 having one database 104 and one database control agent 106 is depicted for clarity and convenience, as is just one client program code 112. Similarly, just one pair of command program code 114 and dispatch program code 116 is depicted for clarity and convenience, as is just one API 118 and one communication stream 120.

In the example, the command program code 114 has a command queue 302 that is common to all databases 104 for which command program code 114 is responsible, and the dispatch program code 116 has an agent map 304 that is similarly common to all databases 104 for which the dispatch program code 116 is responsible. As database commands are received from the client program code 112 via the API 118, the command program code 114 stores the commands in the command queue 302. As control agents 106 initiate communication streams 120, the dispatch program code 116 adds the control agents to the agent maps 304.

Figure 4A:
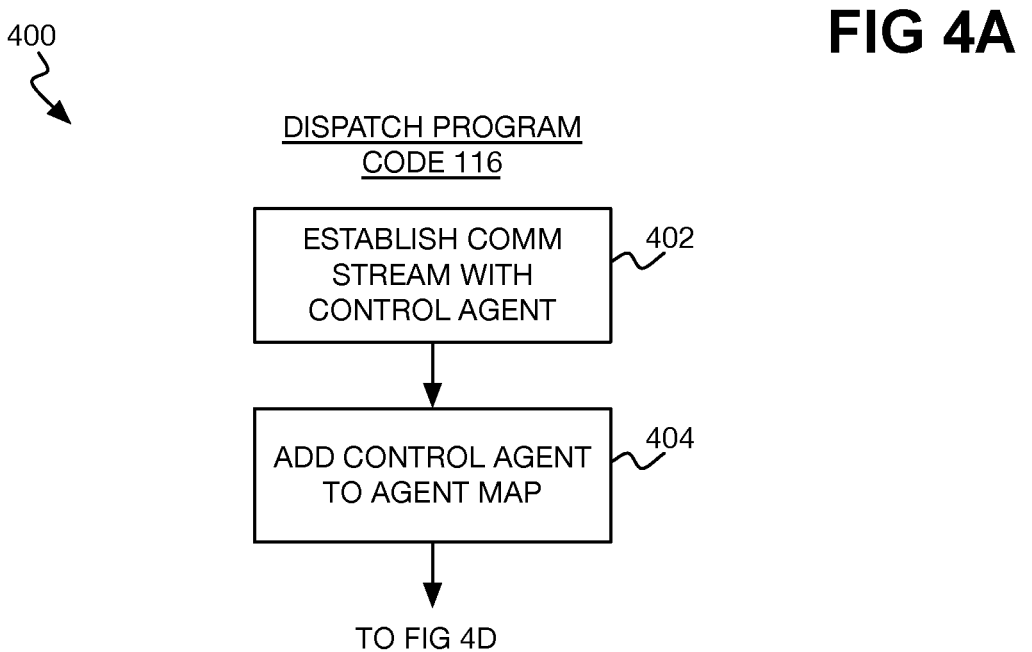
FIGS. 4A, 4B, 4C, and 4D are flowcharts of example methods consistent with FIG. 2 and that are used in the example implementation of FIG. 3 to dispatch received database commands from the management network to the database network.

FIGS. 4A, 4B, 4C, and 4D respectively show example methods 400, 410, 420, and 440 as to how database commands and database control agents 106 are processed in the system 300 in detail. In FIG. 4A, at initiation by a database control agent 106, the dispatch program code 116 establishes a communication stream 120 with the database control agent 106 (402). The dispatch program code 116 then adds the control agent 106 to the agent map 304 (404), and processing proceeds to FIG. 4D.

Figure 4B:
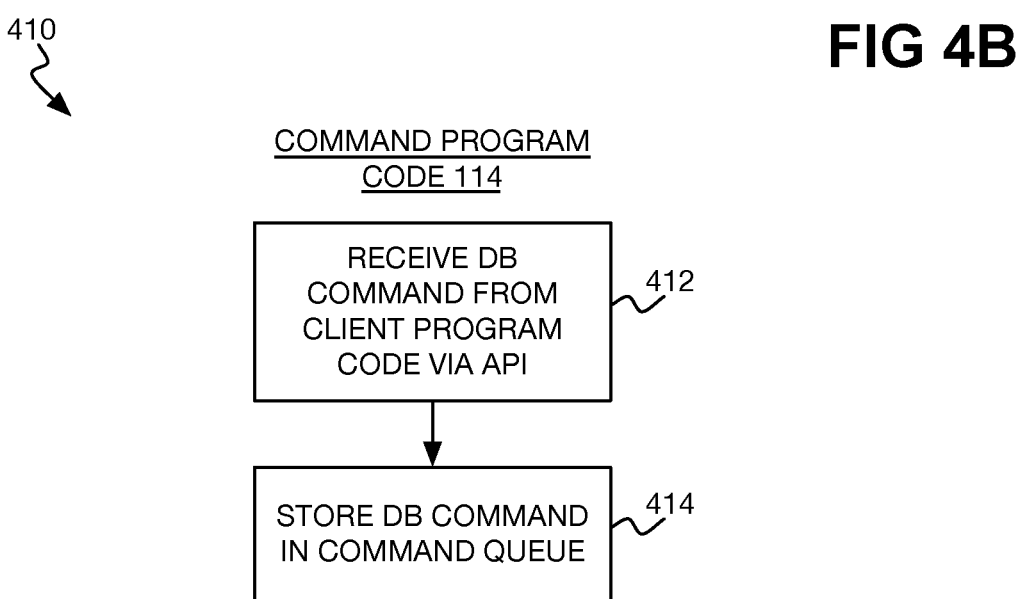

In FIG. 4B, at transmission by a client program code 112, the command program code 114 receives via the API 118 a database command intended for a given database 104 (412). The command program code 114 stores the database command in the command queue 302 (414).

Figure 4C:
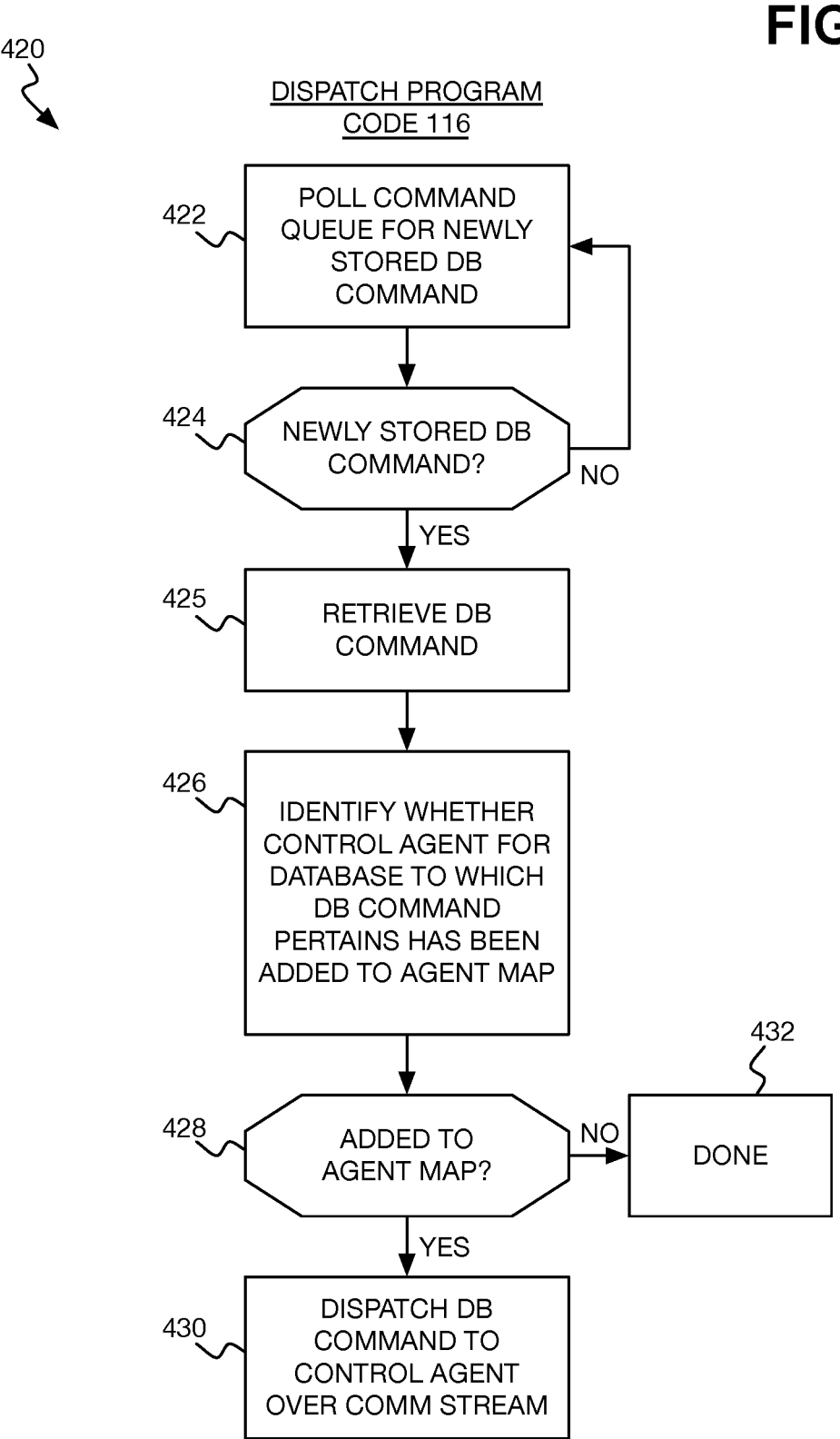

In FIG. 4C, the dispatch program code 116 periodically polls the command queue 302 for a database command newly stored in the queue 302 by the command program code 114 (422). If no such newly stored database command is identified (424), the dispatch program code 116 continues with periodically polling the command queue 302 (422). Once a newly stored database command has been identified (424), however, the dispatch program code 116 retrieves the database command from the command queue 302 (425), but does not actually remove the command from the queue 302.

The dispatch program code 116 then identifies whether a control agent 106 has been added to the agent map 304 for the database 104 to which the database command pertains (426). If there is such a control agent 106 (428), then the dispatch program code 116 dispatches the database command to the control agent 106 over the appropriate communication stream 120 for execution against the database 104 in question (430). However, if there is no control agent 106 in the agent map 304 for the database 104 to which the database command pertains (428), then the method 420 is finished (432). Note in this case, though, that the database command is maintained in command queue 302 (i.e., it is not deleted from the queue 302).

Figure 4D:
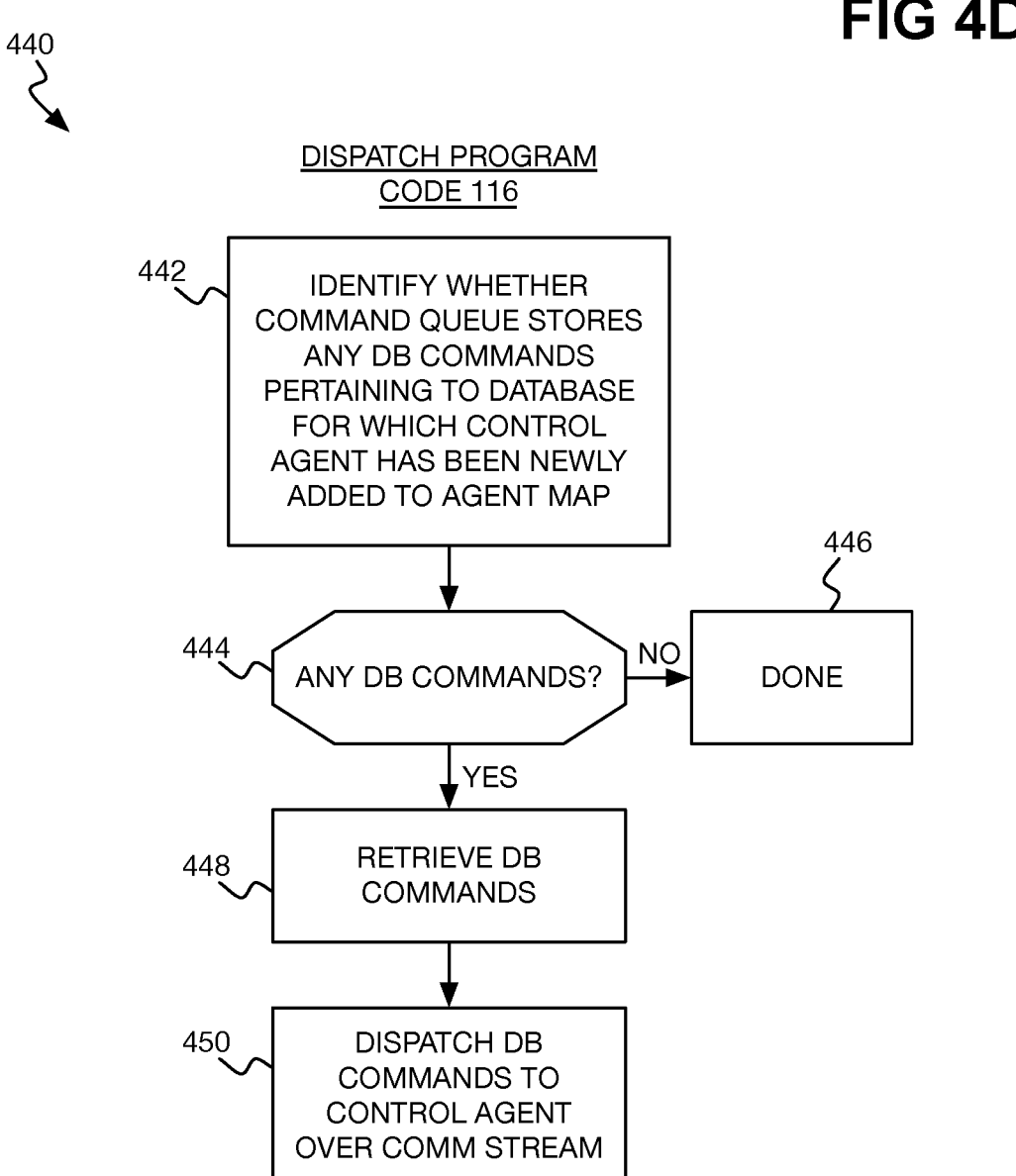

In FIG. 4D, after a control agent 106 for a given database 104 has been newly added to the agent map 304 per FIG. 4A, the dispatch program code 116 identifies whether the command queue 302 stores any database commands pertaining to this given database 104 (442). If there are no such database commands (444), then the method 440 is finished (446).

However, if there are any such database commands for the database 104 to which control agent 106 pertains (444), the dispatch program code 116 retrieves each such command from the command queue 302 (448), again without removing the command from the queue 302. The dispatch program code 116 then dispatches each retrieved database command to the newly added control agent 106 over the appropriate communication stream 120 for execution against the database 104 in question (450).

In the system 300, as operated per the methods 400, 410, 420, and 440, database commands can be received from client program code 112 for databases 104 of which database control agents 106 have not yet initiated communication streams 120. Such database commands remain in the command queue 302. When database control agents 106 for the databases 104 to which these database commands pertain have communication streams 120 established and are added to the agent map 304, at that time the commands can be dispatched to the control agents 106 for execution.

Figure 5:
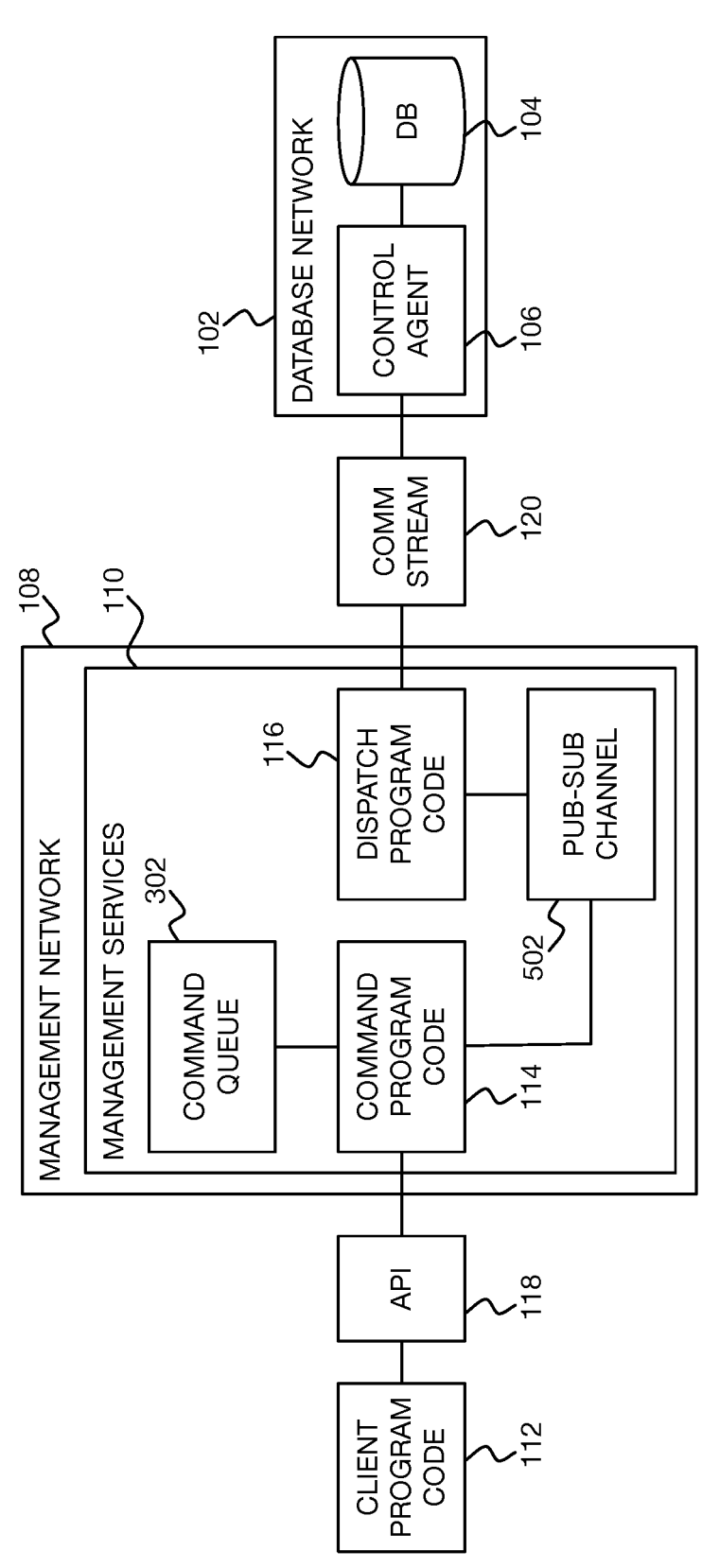
FIG. 5 is a diagram of a second example implementation of a management network consistent with FIG. 1 and that is to communicatively connect with a database network using a communication stream without having to expose or open network ports on the database network.

FIG. 5 shows another specific implementing architecture or system 500 that is consistent with the general architecture or system 100. In the example, just one database network 102 having one database 104 and one database control agent 106 is depicted for clarity and convenience, as is just one client program code 112. Similarly, just one pair of command program code 114 and dispatch program code 116 is depicted for clarity and convenience, as is just one API 118 and one communication stream 120.

In the example, as control agents 106 initiate communication streams 120, the dispatch program code 116 instantiates publication-subscription channels 502 and subscribes the control agents 106 to their respective channels 502. That is, there is a separate publication-subscription channel 502 associated with each control agent 106 with which a communication stream 120 has been established. The publication-subscription channel 502 may be a publication-subscription channel provided by the open-source Redis in-memory data structure store available on the Internet at redis.io.

In the example, the command program code 114 has a command queue 302, which is common to all databases for which command program code 114 is responsible. When a database command for such a database 104 is received from the client program code 112 via the API 118, the command program code 114 stores the command in the command queue 302. The command program code 114 then publishes the database command to the publication-subscription channel to which the control agent 106 for the database 104 in question subscribes.

FIGS. 6A, 6B, and 6C respectively show example methods 600, 610, and 630 as to how database commands and database control agents 106 are processed in the system 500 in detail. In FIG. 6A, at initiation by a database control agent 106, the dispatch program code 116 establishes a communication stream 120 with the database control agent 106 (602). The dispatch program code 116 also instantiates a publication-subscription channel 502 for the database control agent 106 (604), and subscribes the control agent 106 to the channel 502 (606). Processing then proceeds to FIG. 6C.

In FIG. 6B, at transmission by a client program code 112, the command program code 114 receives via the API 118 a database command intended for a given database 104 (612). The command program code 114 stores the database command in the command queue 302 (614). The command program code 114 identifies whether a publication-subscription channel 502 has been instantiated for the control agent 106 for the database 104 to which the database command pertains (616).

If such a publication-subscription channel 502 has been instantiated (618), then the command program code 114 publishes the database command to the channel 502 (602). This effectively causes the dispatch program code 116 to dispatch the command to the control agent 106 subscribing to the channel 502, over the appropriate communication stream 120, for execution against the database 104 in question (622). However, if a channel 502 has not been instantiated for the control agent 106 for the database 104 to which the database command pertains, the method 610 is finished (624). Note in this case, though, that the command is maintained in the command queue 302.

In another implementation different than FIG. 6B, the command program code 114 does not identify whether a publication-subscription channel 502 has been instantiated for the control agent 106 for the database 104 to which the database command pertains. Rather, the command program code 114 publishes the database command. If there are no subscribers to the channel 502 (i.e., if a channel 502 has not been instantiated for the control agent 106 in question), then this information is returned to the program code 104. That is, the command program code 114 receives a response indicating that publication was attempted, but there were no listening subscribers (i.e., the control agent 106 in question).

In FIG. 6C, after a publication-subscription channel 502 has been instantiated for a database control agent 106 for a given database 104 and the control agent 106 subscribed to the channel 502 per FIG. 6A, the command program code 114 identifies whether the command queue 302 stores any database commands pertaining to this given database 104 (632). If there are no such database commands (634), then the method 630 is finished (642).

However, if there are any such database commands for the database 104 to which the control agent 106 pertains (634), the command program code 114 retrieves each such command from the command queue 302 (636), without removing the command from the queue 302. The command program code 114 publishes each retrieved command to the newly instantiated publication-subscription channel 502 (638). As before, this effectively results in the dispatch program code 116 dispatching each command to the control agent 106 subscribing to the channel 502, over the appropriate communication stream 120, for execution against the database 104 in question (640).

In the system 500, as operated per the methods 610, 620, and 630, database commands can be received from client program code 112 for databases 104 of which database control agents 106 have not yet initiated communication streams 120. Such database commands remain in the command queue 302. When database control agents 106 for the databases 104 to which these database commands pertain have communication streams established 120 and are subscribed to instantiated publication-subscription channels

502, at that time the commands can be dispatched in the order in which the commands were received to the control agents 106 for execution.

FIG. 7 shows an example method 700 as to how execution results for a database command are processed in both the systems 300 and 500. The dispatch program code 116 receives execution results from a database control agent 106 that has executed a dispatched database command against a database 104, over the communication stream 120 (702). The dispatch program code 116 provides the execution results to the command program code 114 (704), which thus receives them (706). As noted above, in one implementation, the execution results are returned in response to a subsequent query by the originating program code 112 via the API 118.

The command program code 114 identifies the client program code 112 that sent the database command to which the execution results pertain (708). For example, command program code 114 may identify the client program code 112 along with the database command in the command queue 302. The command program code 114 returns the execution results to the client program code 112 in question via the API 118 (710), and removes the database command from the command queue 302 (712). As noted above, in one implementation, the execution results are returned in response to a subsequent query by the originating program code 112 via the API 118.

In the systems 300 and 500, then, a database command is removed from the command queue 302 just when its execution results have been returned to the client program code 112. When a database command is received from client program code 112, ordinarily it is quickly dispatched to the appropriate control agent 106 for processing against the database 104 to which the command pertains, using a polling mechanism (per the system 300) or a publication-subscription mechanism (per the system 500). However, even at dispatch, the database command remains in the command queue 302.

When a database command is received from client program code 112 that pertains to a database 104 for which a database control agent 106 has not yet initiated a communication stream 120, the database command also still remains in the command queue 302. Therefore, when a database control agent 106 for this database 104 does initiate a communication stream 120, the database command can be retrieved from the command queue 302 and dispatched at that time to the control agent 106.

Figure 8:
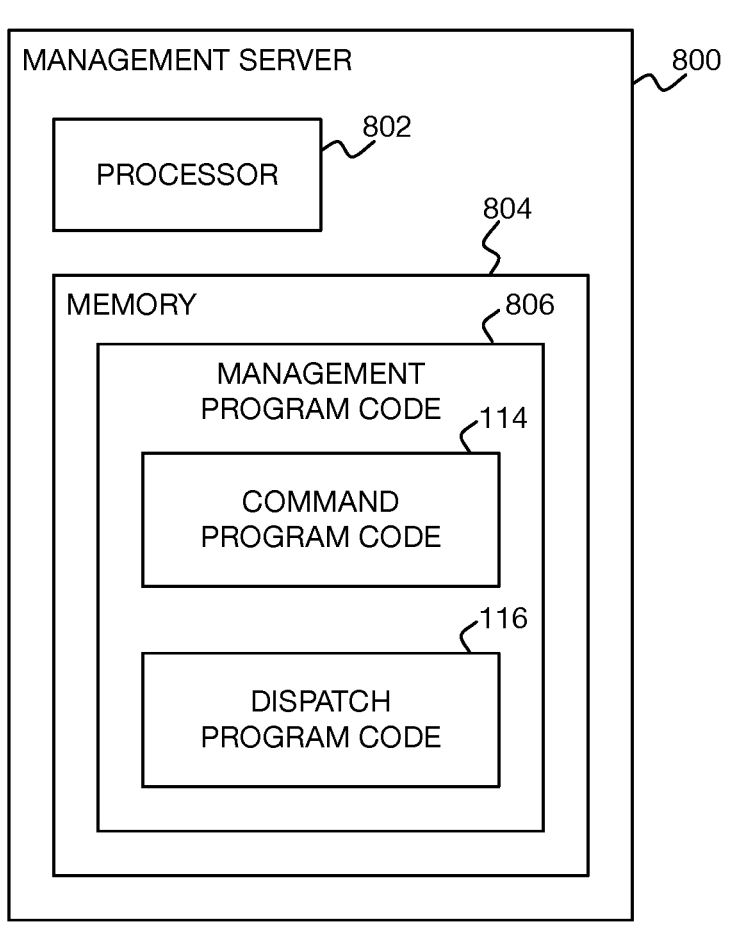
FIG. 8 is a diagram of an example management server of a management network consistent with FIGS. 1, 3, and 5.

FIG. 8 shows an example management server 800 that can implement a management or control plane (i.e., the management services 110 that have been described). The management server 800 includes a processor 802 and a memory 804. The memory 804 is an example of a non-transitory computer-readable data storage medium. The memory 804 stores management program code 806 that is executable by the processor 802 to perform processing. The management program code 806 can include the command program code 114 and the dispatch program code 116 that have been described.

The techniques that have been described permit database commands, including DQL commands for querying a database 104 and DCL commands for controlling the database 104, to be dispatched to a database network 102 hosting the database 104, without having to open or expose any network ports on the network 102. Rather, a communication stream 120 is established between the database network 102 and the management network 108 from which the commands are dispatched.

Usage of such communication streams 120 promotes partial or complete third-party management of a database 104 of an organization without the organization incurring any undue security vulnerabilities. The described techniques can also be employed for dispatch of database commands for execution against databases 104 in contexts other than partial or complete third-party management of the databases 104. For instance, potentially all communication with a database 104 can be performed using the described techniques.

We claim:

1. A non-transitory computer-readable data storage medium storing management program code executable by a management server on a management network to perform processing comprising:

establishing a first communication stream with a first database control agent for a first database on a first database network separate from the management network, without opening any ports on the first database network for access by the management program code;

instantiating a first publication/subscription channel associated with the first database and subscribing the first database control agent to the first publication/subscription channel;

receiving a first database command for the first database from first client program code;

publishing the first database command to the first publication/subscription channel, wherein publication causes dispatch of the first database command to the first database control agent over the first communication stream, for execution against the first database;

receiving execution results of the first database command from the first database control agent over the first communication stream;

returning the execution results to the first client program code in satisfaction of the first database command;

establishing a second communication stream with a second database control agent for a second database on a second database network separate from the management network, without opening any ports on the second database network for access by the management program code;

instantiating a second publication/subscription channel associated with the second database and subscribing the second database control agent to the second publication/subscription channel;

receiving a second database command for the second database from second client program code; and publishing the second database command to the second publication/subscription channel, wherein publication causes dispatch of the second database command to the second database control agent over the second communication stream, for execution against the second database.

2. The non-transitory computer-readable data storage medium of claim 1, wherein establishing the first communication stream with the first database control agent comprises receiving initiation of the first communication stream by the first database control agent over a Google Remote Procedure Call (gRPC) framework.

3. The non-transitory computer-readable data storage medium of claim 2, wherein receiving the first database command comprises receiving the first database command over a representational state transfer (REST) application programming interface (API), and wherein returning the execution results comprises returning the execution results over the REST API.

4. The non-transitory computer-readable data storage medium of claim 1, wherein the first database command comprises a database query language (DQL) command to query the first database, or a data control language (DCL) to manage the first database.

5. The non-transitory computer-readable data storage medium of claim 1, wherein the management network comprises a public network over which partial management of the first database occurs, and the database network comprises a private network on which the first database is hosted.

6. The non-transitory computer-readable data storage medium of claim 1, wherein the processing further comprises:

upon establishing the first communication stream, adding the first database control agent to an agent map;

upon receiving the first database command, storing the first database command within a command queue;

periodically polling the command queue to identify that the first database command has been newly stored within the command queue;

upon identifying that the first database command has been newly stored within the command queue, retrieving the first database command from the command queue without removing the database command from the command queue; and upon retrieval of the database command from the command queue, identifying within the agent map the first database control agent for the first database to which the first database command pertains for dispatch of the first database command.

7. The non-transitory computer-readable data storage medium of claim 6, wherein the processing further comprises:

upon receiving the execution results, identifying within the command queue the database command to which the execution results pertain for returning the execution results to the first client program code from which the identified first database command was received; and removing the first database command from the command queue.

8. The non-transitory computer-readable data storage medium of claim 6, wherein the processing further comprises:

storing the second database command within the command queue;

periodically polling the command queue to identify that the second database command has been newly stored within the command queue;

retrieving the second database command from the command queue without removing the second database command from the command queue;

identifying within the agent map whether there is the second database control agent for the second database to which the second database command pertains for dispatch of the second database command; and in response to identifying within the agent map that there is no second database control agent for the second database to which the second database command pertains for dispatch of the second database command, maintaining the second database command within the command queue.

9. The non-transitory computer-readable data storage medium of claim 8, wherein the processing further comprises:

adding the second database control agent to the agent map;

upon adding the second database control agent to the agent map, identifying that the command queue stores the second database command for the second database to which the second database control agent pertains;

upon identifying that the command queue stores the second database command for the second database to which the second database control agent pertains, retrieving the second database command from the command queue without removing the second database command from the command queue; and wherein the second database command is published to the second publication/subscription channel upon retrieval of the second database command from the command queue.

10. The non-transitory computer-readable data storage medium of claim 9, wherein the processing further comprises:

receiving second execution results of the second database command from the second database control agent over the second communication stream;

upon receiving the second execution results, identifying within the command queue the second database command to which the second execution results pertain;

returning the second execution results to the client second program code from which the identified second database command was received in satisfaction of the second database command; and removing the second database command from the command queue.

11. The non-transitory computer-readable data storage medium of claim 1, wherein the processing further comprises:

storing the first database command within a command queue.

12. The non-transitory computer-readable data storage medium of claim 11, wherein the processing further comprises:

upon receiving the execution results, identifying the first database command to which the execution results pertain within the command queue for returning the execution results to the first client program code from which the identified first database command was received; and removing the first database command from the command queue.

13. The non-transitory computer-readable data storage medium of claim 11, wherein the processing further comprises:

storing the second database command within the command queue;

identifying whether the second database to which the second database command pertains is associated with any second publication/subscription channel; and in response to identifying that the second database is not yet associated with any second publication/subscription channel, maintaining the second database command within the command queue.

14. The non-transitory computer-readable data storage medium of claim 13, wherein the processing further comprises:

in response to identifying that the command queue stores the second database command for the second database with which the second publication/subscription channel is associated, retrieving the second database command from the command queue without removing the second database command from the command queue, wherein the second database command is published to the second publication/subscription channel upon retrieval of the second database command from the command queue, publishing the second database command to the second publication/subscription channel.

15. The non-transitory computer-readable data storage medium of claim 14, wherein the processing further comprises:

receiving second execution results of the second database command from the second database control agent over the second communication stream;

upon receiving the second execution results, identifying within the command queue the second database command to which the second execution results pertain;

returning the second execution results to the second client program code from which the identified second database command was received in satisfaction of the second database command; and removing the second database command from the command queue.

16. A management server on a management network, comprising:

a processor; and a memory storing management program code executable by the processor to perform processing comprising:

establishing a first communication stream with a first database control agent for a first database on a first database network separate from the management network, without opening any ports on the first database network for access by the management program code;

instantiating a first publication/subscription channel associated with the first database and subscribing the first database control agent to the first publication/subscription channel;

receiving a first database command for the first database from first client program code;

publishing the first database command to the first publication/subscription channel, wherein publication causes dispatch of the first database command to the first database control agent over the first communication stream, for execution against the first database;

receiving execution results of the first database command from the first database control agent over the first communication stream;

returning the execution results to the first client program code in satisfaction of the first database command;

establishing a second communication stream with a second database control agent for a second database on a second database network separate from the management network, without opening any ports on the second database network for access by the management program code;

instantiating a second publication/subscription channel associated with the second database and subscribing the second database control agent to the second publication/subscription channel;

receiving a second database command for the second database from second client program code; and publishing the second database command to the second publication/subscription channel, wherein publication causes dispatch of the second database command to the second database control agent over the second communication stream, for execution against the second database.

17. The management server of claim 16, wherein the processing further comprises:

storing the second database command within a command queue;

identifying whether the second database to which the second database command pertains is associated with any second publication/subscription channel; and in response to identifying that the second database is not yet associated with any second publication/subscription channel, maintaining the second database command within the command queue.

18. The management server of claim 17, wherein the processing further comprises:

in response to identifying that the command queue stores the second database command for the second database with which the second publication/subscription channel is associated, retrieving the second database command from the command queue without removing the second database command from the command queue, wherein the second database command is published to the second publication/subscription channel upon retrieval of the second database command from the command queue, publishing the second database command to the second publication/subscription channel.

19. A method performed by a management server and comprising:

establishing a first communication stream with a first database control agent for a first database on a first database network separate from a management network without opening any ports on the first database network for access by the management server;

instantiating a first publication/subscription channel associated with the first database and subscribing the first database control agent to the first publication/subscription channel;

receiving a first database command for the first database from first client program code;

publishing the first database command to the first publication/subscription channel, wherein publication causes dispatch of the first database command to the first database control agent over the first communication stream, for execution against the first database;

receiving execution results of the first database command from the first database control agent over the first communication stream;

returning the execution results to the first client program code in satisfaction of the first database command;

establishing a second communication stream with a second database control agent for a second database on a second database network separate from the management network, without opening any ports on the second database network for access by the management program code;

instantiating a second publication/subscription channel associated with the second database and subscribing the second database control agent to the second publication/subscription channel;

receiving a second database command for the second database from second client program code; and publishing the second database command to the second publication/subscriptio channel, wherein publication causes dispatch of the second database command to the second database control agent over the second communication stream, for execution against the second database.

20. The method of claim 19, further comprising:

storing the second database command within a command queue;

identifying whether the second database to which the second database command pertains is associated with any second publication/subscription channel;

in response to identifying that the second database is not yet associated with any second publication/subscription channel, maintaining the second database command within the command queue; and in response to identifying that the command queue stores the second database command for the second database with which the second publication/subscription channel is associated, retrieving the second database command from the command queue without removing the second database command from the command queue, wherein the second database command is published to the second publication/subscription channel upon retrieval of the second database command from the command queue, publishing the second database command to the second publication/subscription channel.

* * * * *